United States Patent [19]

Kosarzecki

[11] Patent Number: 4,921,547

[45] Date of Patent: May 1, 1990

[54] PROPORTIONAL PRIORITY FLOW REGULATOR

[75] Inventor: Constantine Kosarzecki, Iverness, Ill.

[73] Assignee: Vickers Incorporated, Troy, Mich.

[21] Appl. No.: 385,736

[22] Filed: Jul. 26, 1989

[51] Int. Cl.[5] ..................... G05D 11/13; F16K 31/363

[52] U.S. Cl. .................................... 137/115; 137/504; 137/454.6; 251/29

[58] Field of Search ............... 137/110, 115, 118, 117, 137/504, 489, 454.6; 251/29, 30.01, 30.02, 30.03, 30.04, 30.05

[56] References Cited

U.S. PATENT DOCUMENTS

| | | | |
|---|---|---|---|
| 2,859,762 | 11/1958 | Banker | 137/115 X |
| 3,339,580 | 9/1967 | Cutler et al. | 137/504 |
| 3,448,757 | 6/1969 | Mercier | 137/115 |
| 4,226,259 | 10/1980 | Szekely et al. | 137/489 X |
| 4,821,625 | 4/1989 | Sundberg | 137/118 X |

FOREIGN PATENT DOCUMENTS

| | | | |
|---|---|---|---|
| 143612 | 11/1980 | Japan | 137/115 |

*Primary Examiner*—Stephen M. Hepperle
*Attorney, Agent, or Firm*—Richard Bushnell

[57] ABSTRACT

A proportional priority flow regulator valve structure comprising a cartridge-type modulated orifice valve element (MOS) in a composite multiple element valve assembly. The MOS valve operates in an hydraulic circuit to receive pressurized fluid from a source of supply and responds to variations in fluid pressure and fluid flow rates acting hydraulically on a pair of interdependent spring-biased spools of the valve to provide a modulated orifice for delivery of a controlled fluid flow.

14 Claims, 2 Drawing Sheets

PROPORTIONAL PRIORITY FLOW REGULATOR

BACKGROUND OF THE INVENTION

The present invention relates to a valve assembly for regulating the flow of hydraulic fluid used in an hydraulic circuit for a machine or vehicle. More particularly, the invention is directed to a proportional priority flow regulator valve constituting a valve component in a composite multiple-element valve assembly.

Flow regulator valves of the general type of the present invention find utility in many different hydraulic circuits for machines and vehicles where it is desired to have the option of providing a regulated flow output, on a priority basis, to a particular selectable device or machine. The present invention finds utility in a system in which a pump or other supply source of hydraulic fluid under pressure is capable of various rates of fluid-flow output. Utilization of the valve of the invention ensures that all of the pumped fluid is directed, on a priority basis, first to provide a regulated rate of flow through a regulated output port of the valve, and to direct any excess of fluid to a by-pass port.

SUMMARY OF THE INVENTION

The present invention relates to proportional priority flow regulator valve structure constituting cartridge-type valve elements in a composite multiple element valve assembly The regulator operates in an hydraulic circuit to receive pressurized fluid from a pump or other supply and responds to variations in fluid pressure and fluid flow rates acting hydraulically on a pair of interdependent spring-biased spools of a novel modulated orifice valve to provide a modulated orifice for delivery of a controlled fluid flow supply to a pressure compensated priority flow divider valve to divide flow on a priority basis to a fluid-driven mechanism, and to direct excess fluid to a by-pass port.

It is a general object of the present invention to provide, in conjunction with cooperating cartridge-type valve elements all housed in the same valve body or manifold and including a modulated pressure relief valve and a priority flow divider valve, a cartridge-type modulated orifice valve.

The resulting combination of intercoupled valves establishes a regulated flow output ensuring that fluid pumped is directed, in a priority basis, first to a regulated output port and any excess to a by-pass port.

In a preferred embodiment the modulated orifice spool (MOS) valve of the invention includes a principal spool having a "long stroke" and biased by a "high-rate" spring. The combination described ensures more reliable operation by reducing adverse effects ordinarily resulting from internal friction, inertia and fluid viscosity, and providing positive valve positioning and operation (opening and closing of ports and passages smoothly and definitively).

It is a related feature of the invention that there is provided a series of spirally arranged ports or apertures supplying the capability of a more or less "infinite" variation in the size of an outlet port within its physical limits.

Yet another important feature of the invention is the use of a pressure compensating flow regulator for controlling a pilot flow, thereby enhancing the overall accuracy, smoothness of operation, and the reliability of the overall fluid flow control system.

Another significant mechanical refinement provided by the modulated orifice valve of the invention is the provision of a plurality of passageways each of a diameter less than but having a combined overall cross section greater than that of a flow regulating inlet orifice supplied by the passageways. This arrangement establishes the passageways as an effective filter or screen to prevent contaminants from reaching and obstructing the flow-control orifice.

Still another feature of the modulated orifice valve of the invention is the prevention of back-up pressure build-up from fluid leakage The valve is provided with a helically arrayed series of ports so disposed that when a principal spool or piston of the valve is fully retracted, so as to shut-off fluid pressure from a supply line, one of the ports of the helical series is partially uncovered and connected to a drain.

BRIEF DESCRIPTION OF THE DRAWINGS

The foregoing, as well as other objects, features and advantages of the invention will become evident upon reading the following detailed description of the illustrated embodiment, considered together with the drawings wherein.

VALVE MANIFOLD SYSTEM IN WHICH THE INVENTION FINDS UTILITY

Figure 1:
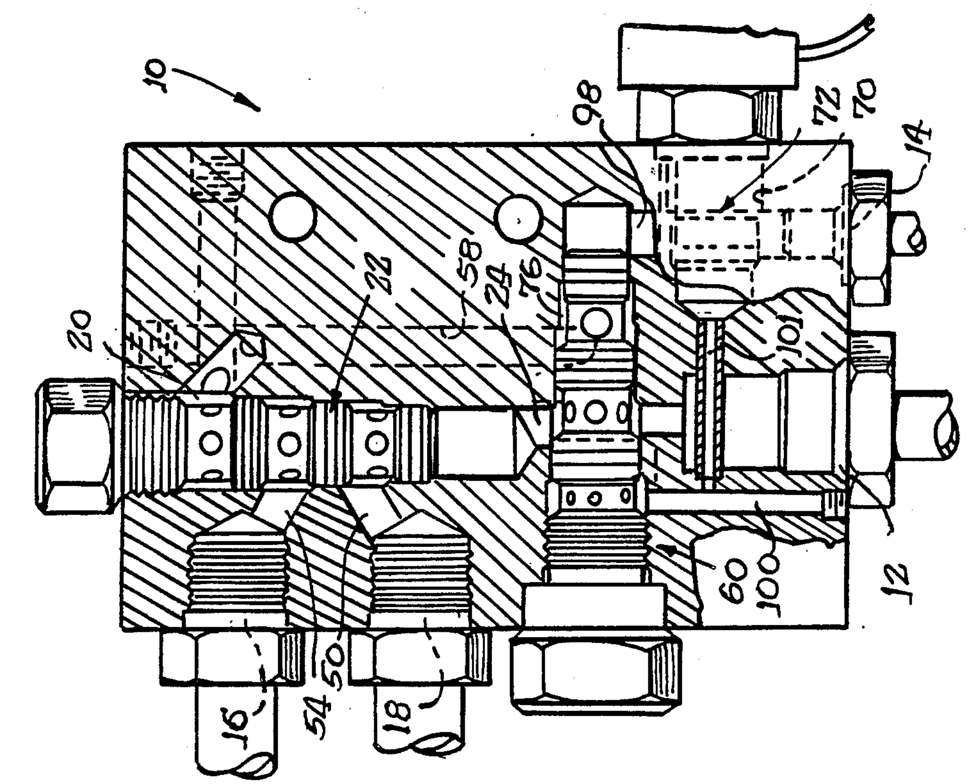
FIG. 1 is a top view, partially in section, of a valve body or manifold indicating schematically the relative placement and interconnections of a plurality of intercooperating valve elements or cartridges and also showing input and exhaust passages and ports.

As shown in FIG. 1 of the drawings, there is provided a valve body or manifold 10 having an inlet or pressure inlet port 12 connectable with a pump (not shown) or other source of fluid under pressure and an outlet port 14 connectable with a tank or drain (not shown). The valve body 10 is also provided with a port 16 for providing a regulated output flow of fluid which is to be directed to an element such as a hydraulic motor, piston or the like of a machine to be actuated.

The valve body also includes a port 18 constituting a fluid by-pass port connectable with a tank or reservoir (not shown) or with another hydraulic motor or piston to be operated by any fluid in excess of that which is necessary for satisfying the demands and requirements of the flow through the regulated flow port 16.

Figure 2:
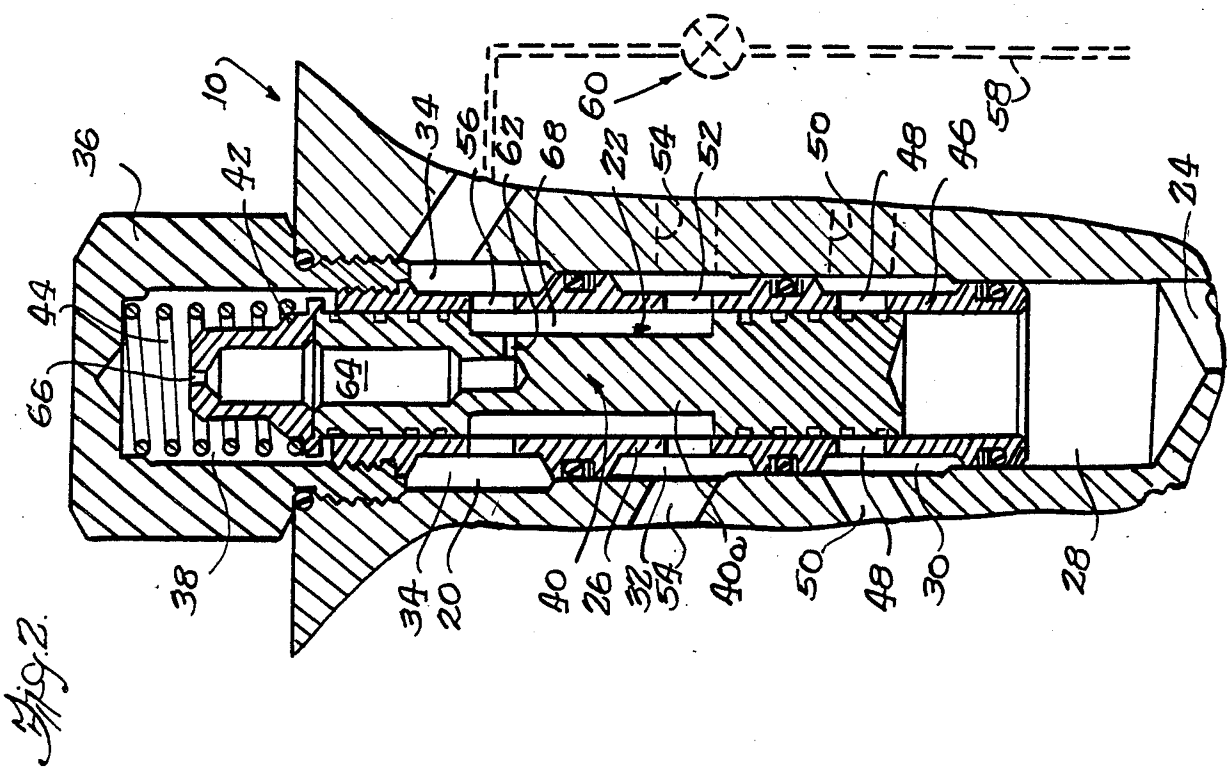
FIG. 2 is a side view, partly in section, of one of the valve cartridges housed in a valve body finding utility in the present invention and indicating schematically connections with the modulated orifice valve of the invention.

Referring further to the valve body 10, there is provided, between the pressure inlet port 12 and the regulated and the by-pass out ports 16 and 18 an elongated generally tubular cavity 20 containing a cartridge type pressure compensated spool (PCS) valve 22. The PCS valve functions as a priority flow divider. The PSC valve cartridge 22 is connected by means of a pressure inlet passageway 24 to the pressure inlet port 12. As shown in FIG. 2, the valve cartridge 22 comprises a cage 26 nested in the cavity 20 to define a lower input cavity 28 and a series of lineally spaced annular cavities 30, 32 and 34. A cap 36 threaded to the outer end of the cage is also threaded into an end portion of the principal cavity 20 in the valve body 10. The cap 36 defines interiorly a spring chamber 38.

A valve spool 40 is slidably and reciprocally disposed within the cage 26, the spool 40 carrying a spring retainer 42 at its upper end and engageable with a compression spring 44 which serves to bias the spool 40 downwardly. The cage 26 of the PCS valve has a lower set of apertures 48 communicating with the annular cavity 30 and with a by-pass fluid outlet passageway 50. A second set of apertures 52 in the cage 46 communicates with the cavity portion 32 and with a regulated flow outlet passageway 54.

A third set of apertures 56 in the cage 26 communicates with the cavity portion 34 A passageway 58 (shown schematically in FIG. 2) extends from the pressure inlet 12 to the cavity portion 34 through the modulated orifice spool valve (FIG. 1) (MOS) 60 which is described herebelow.

The MOS valve 60 controls the pressure of fluid directed to the cavity portion 34 of the PCS valve for the purpose and in accordance with the method described hereinafter. An orifice 62 (FIG. 2) extends radially through the spool 40 in communication with the cavity portion 34 and a central bore 64 in the upper end of the spool 40. The bore 64, in turn, communicates with the spring cavity 38 through a restricted orifice 66 in the upper end of the spring retainer cap 42. Thus, fluid in the spring chamber 38 will be pressurized through the MOS valve, the cavity portion 34, the orifice 62, the bore 64 and the orifice 66 at a level controlled by the MOS valve in accordance with the method and operation described below. The pressurized fluid works in conjunction with the spring 44 in resisting movement of the spool or piston 40 upwardly in response to the influence of the pressure of fluid entering through the pressure inlet passageway 24.

By modulating the pressure in the spring chamber 38, the degree of movement and, thus, the position of the piston 40 may be controlled. As evident from FIG. 2 of the drawing, with the piston 40 in the position shown, the fluid entering the cavity 34 will not only pressurize the spring cavity 38 but will also flow through a passageway 68 defined by a reduced diameter portion 40*a* of the spool 40 out through the apertures 52 and the regulated flow discharge passageway 54. If the pressure in the inlet end 24 of the cavity 28 exceeds or over balances the combined pressure in the spring cavity 38 and the force of the spring 44, the spool 40 will move upwardly so as to open at least partially the by-pass apertures or ports 48 and partially close the regulated flow apertures 52.

Referring again to FIG. 1 the valve body 10 is provided with another cavity 70 adapted to receive an electrical relief valve (ERV) 72. This valve is a modulated pressure relief valve utilizing electrically controlled valve actuator means. In general, the electric relief valve 72 is adapted to provide a modulated or adjustable pressure at which fluid will be returned to the drain 14. This variable, adjustable pressure is used to control the modulated orifice spool valve 60 of the present invention, which in turn controls the back pressure in the spring cage 38 of the pressure compensated spool valve 22, and, thus, the regulated flow of the valve system.

The valve body or manifold 10 includes another cavity 76 in which the MOS valve 60 of the invention is inserted, all of the valves described being of the cartridge type.

DETAILED DESCRIPTION OF PREFERRED EMBODIMENT

A principal role and function of the modulated orifice spool (MOS) valve 60 of the invention is to control the pressure of fluid directed to a pressure compensated priority flow divider valve to ensure that in an hydraulic system for delivery of hydraulic fluid to hydraulically actuated or driven machines or vehicles, first priority is given to providing flow to the regulated outlet port and, when this flow rate has been satisfied, to direct the remaining fluid to a by-pass port.

Figure 3:
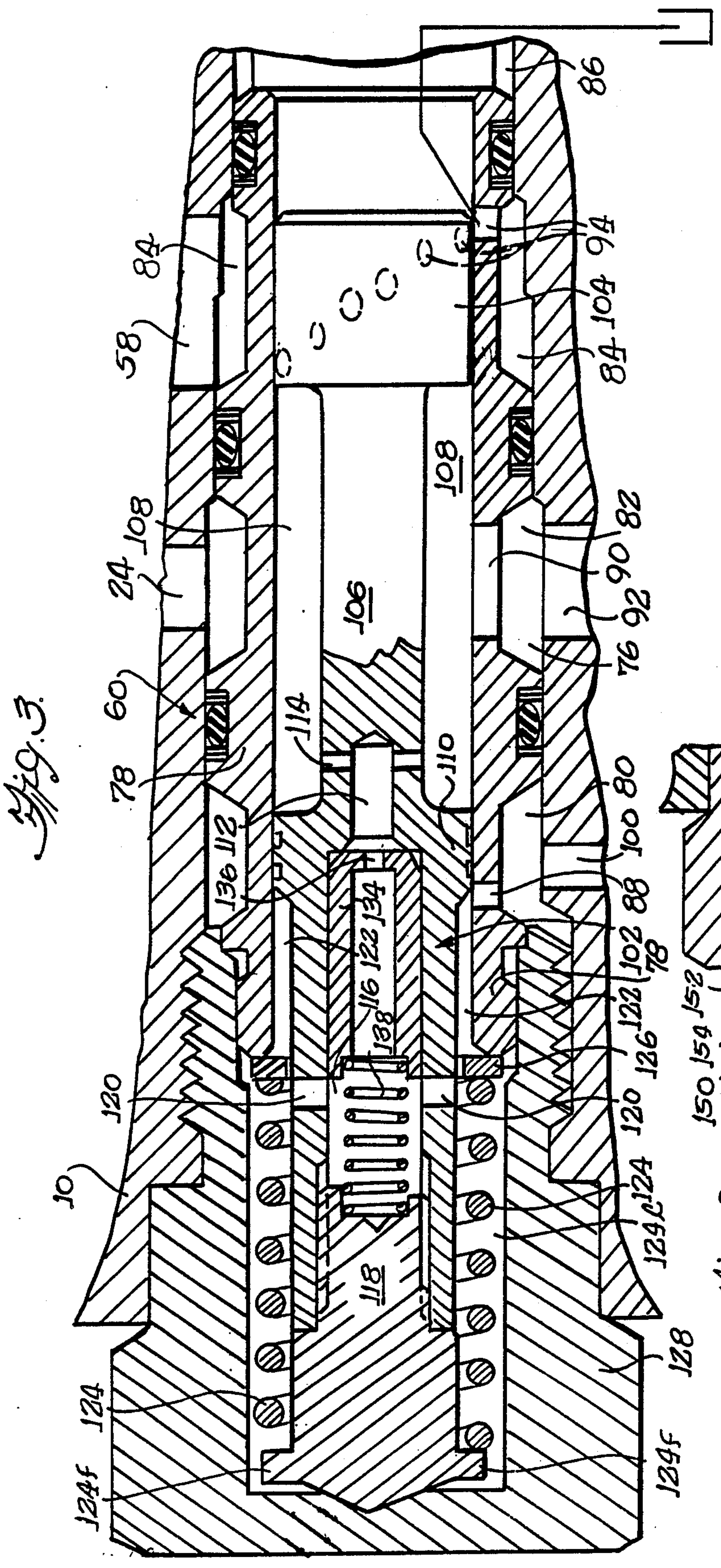
FIG. 3 is a relatively enlarged, side view, partly in section and illustrating the modulated spool orifice valve of the invention.

Referring now more particularly to the MOS valve 60 of the invention, in FIG. 3, the cartridge of the valve is shown on an enlarged scale. As depicted, the valve 60 includes a cage 78 fitting within the cavity 76 of the valve body 10, the cage or housing 78 of the valve being stepped radially to provide a series of cavity portions or annular channels 80, 82, 84, and 86, The cage-like housing 78 is formed with one or more radial apertures, passages or ports 88 extending through the wall of the cage 78 and communicating with a first annular channel 80 and with ports 90 communicating with the annular channel 82 and, thus, with a pressure inlet or fluid entry port 92 which communicates in turn with the inlet 12 (FIG. 1) in the manifold or valve body 10. In addition, the valve housing 78 is provided with a series of radially extending fluid transmission apertures 94 which, in the preferred embodiment of the invention illustrated are arranged in a helical array for communicating with the annular channel 84 and with a passageway 58 for regulated flow.

A lower annular channel 86 communicates with a passageway 98 in the valve body 10, which in turn extends to and is connected with the drain outlet port 14 in the valve body 10 (FIG. 1).

Referring now again to the top of the valve cage 78, the annular channel 80 communicates with a passageway 100 in the valve body and is, in turn, connected by a transverse tube 101 press fit in a leak proof manner to the cavity 70 and then to the drain port 14 through the variable orifice of the invention, the latter being, in effect, provided by the electrical relief valve 72.

The MOS valve 60 of the invention further comprises an outer spool or piston 102 having an enlarged lower end or body portion 104 capable of substantially blocking all of the helically arranged fluid transmission apertures 94. A reduced mid portion 106 of the outer spool 102 defines with the housing of the MOS valve an annular passageway 108 which may connect the pressure port 90 with pressure regulating ports or fluid transmission apertures 94 when the spool 102 is appropriately moved. A second enlarged body portion 110 of the outer spool 102 is positioned for progressively blocking the orifice or passage 88 upon movement of the piston or outer spool 102. In addition, the outer spool 102 is formed with a central bore 112 connected with the annular passageway 108 by means of a plurality (preferably six) small diameter passageways 114. The central bore 112 communicates with an enlarged counter-bore chamber 116 having its upper end closed and sealed by a plug 118 so as to define the generally cylindrical chamber 116 within the piston-like spool 102. The chamber communicates through radial ports 120 with an axially extending annular passageway 122, the latter communicating in turn with the ports 88, the annular channel 80, and the passageway 100 which is connected with the electrical relief valve 72.

It will be understood from the foregoing description of the MOS valve 60, that when the spool 102 is in its first or fully retracted position shown in FIG. 3 and hydraulic fluid under pressure enters through the entry port 92 and the pressure port 90 into the annular passage 108, the fluid acting against the enlarged body portions 104 and 110 is balanced so that any movement of the piston or outer sleeve 102 must result from an inbalance between the pressure on the upper end of the spool or piston 102 and the pressure at the lower end of the spool 102. The lower end of the spool is in fluid-flow communication with the drain 14 and, accordingly, is unpressurized.

The upper end of the spool 102 is initially unpressurized, but as the fluid flows through the radial ports of passageways 114 into the counter bore chamber 116, and through the ports 120 into the annular passageway 122, the upper end of the piston 102 which includes the plug 118 will be pressurized so as to bias the outer spool or piston 102 downwardly toward a second position uncovering one or more of the ports 94. This downward movement is resisted by a spring 124 disposed between a flange **124*f* on the top of the plug 118 and a shoulder or washer 126 at the top of the valve housing or cage 78. As shown in the specific embodiment of the invention illustrated, the spring 124 and the upper end of the outer spool 102 and the plug 118 are housed within a spring cavity 124*c* formed in a cap 128 of the assembly which is threaded to the upper or outer end of the spool housing 78 and is also threaded into the wall of the cavity 76** into which the MOS valve is received.

Figure 4:
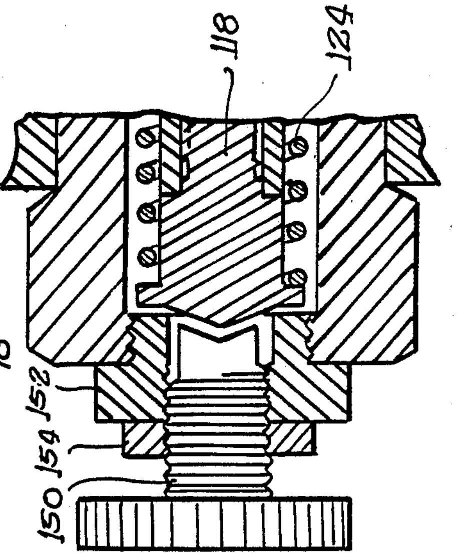
FIG. 4 is a fragmentary view similar to FIG. 3 showing a modified form of the invention.

It is contemplated that two different modes of using the cap 128 may be employed. In a first option, as shown in FIG. 1, the starting force provided by the spring 124 is fixed. In an alternative modification shown in FIG. 4, the cap 128A is so constructed that the starting pressure of the spring 124 may be adjusted by means of a manually adjustable set screw 150 threaded into an adapter 152 in the outer end of the cap 128 and engageable with the outer end of the plug 118 and adapted to be secured into position by a jam nut 154.

As indicated above, fluid flowing from the upper spring chamber **124*c* of the MOS valve out through the passages 88 and the passageway 100 to the ERV valve 72 is maintained at a pressure which may be varied or modulated by means of the variable discharge orifice provided by the ERV valve 72**.

The MOS valve 60 is provided with an internal pressure compensated flow regulator for maintaining the flow rate for this pilot flow constant for any given back pressure. Specifically, a second, inner spool 134 is reciprocally slidable within the counter bore chamber 116 in the outer spool 102. A flow controlling restricted inlet orifice 136 is formed in the floor of the flow regulator inner spool 134, the orifice 136 communicating with the central bore 112. The inner spool 134 is biased against the inlet pressure of the fluid by means of a spring 138. As the pressure in the inlet end 114 of the central bore 112 increases beyond the capacity to be relieved by flow through the restricted orifice 136, the piston like inner spool 134 moves upwardly against the action of the opposing spring 138 for progressively closing the radial ports 120, thereby reducing the fluid flow therethrough.

Thus, the pressure in the spring chamber **124*c* will be reduced enabling the spring 124 to return the outer spool 102 downwardly toward its retracted or neutral position, as shown in FIG. 1 for reducing the regulated flow output of the valve. This reduction in the regulated flow output of the MOS valve will in turn reduce the pressure at the upper end of the pressure compensated spool valve 22 (FIG. 2) for decreasing the flow through the regulated output flow port 16 (FIG. 1**).

Assuming now that the back pressure provided by the electrical relief valve 72 is increased by reducing the size of its variable discharge orifice, the back pressure in the spring chamber **124*c* will be increased and, thus, the outer piston or spool 102 will move downwardly against the action of the opposing spring 124. At the same time, back pressure in the pressure compensating valve chamber or counter bore chamber 116 will be increased so as to move the inner spool 134 downwardly to open the radial ports 120 sufficiently so that the flow outwardly therethrough balances the flow inwardly through the restricted inlet orifice 136**. Thus, as indicated, regardless of the pressure at which the system is operating, the flow through the electric relief valve (pilot valve) will remain constant.

The spring 124 which provides the biasing force for the outer spool 102 is described as a "high rate" spring, and its positioning and operation in the MOS valve is such that the outer spool 102 has a "long stroke" An advantage of this particular arrangement is that more accurate and more reliable and reproduceable control is obtained in the regulated output of the valve. The term "high rate" refers to that characteristic of the spring which enables the pressure the spring exerts on the piston (cage) to increase many times as the spring is compressed from its original position. For example, a low rate spring is one in which the spring might exert a force of, for example, five pounds in starting position and a force of ten pounds in its compressed position so that if the stroke of the piston is one-half inch, there would be a spring rate of ten pounds per inch. By comparison, the present invention contemplates a physical arrangement in which the spring may, for example, have a starting force of five pounds and a final force of ninety pounds so that for a one-half inch stroke, a spring rate of about 170 pounds per inch would be achieved.

By "long stroke" it is contemplated that if the MOS valve of the present invention will have a stroke of about one-half inch This may be compared and contrasted with most proportioning valves which have a stroke of between only about 0.0015 to about 0.0050 inch.

It will be appreciated that utilizing the combination of the "long stroke" with the "high rate" spring, a relatively high pressure change is required to effect movement of the outer spool or piston 102. This feature is advantageous in that the need for such relatively high pressure changes tends to minimize and reduce the adverse effects that internal friction, inertia, fluid viscosity and the like ordinarily have on the smooth operation and final positioning of a valve piston for any given pressure change.

Another important specific feature of the MOS valve of the present invention is that the utilization of a group of spirally arranged axially overlapping ports or fluid transmission apertures 94 in the lower sector of the valve cage or housing 78. An advantage of this unique arrangement is that in effect it provides the possibility of a more or less infinite variation in the size of the outlet port as might be obtained utilizing an axially extending slot. Such slots are, however, difficult to fabricate and expensive to form in valves of the type involved In contrast, the spirally arranged apertures 94 may be easily drilled.

It is an important feature of the present invention that use of the pressure compensated flow regulating MOS valve for controlling the pilot flow to the PSC valve aids in the overall smoothness and accuracy in the operation and control of the system involved.

Still another significant feature of the structure of the present invention is the relative sizing of the passageways 114 and the flow controlling restricted inlet orifice 136. It is contemplated that the diameter of the passageways 114 will be significantly smaller than the diameter of the inlet orifice 136. However, the provision of an adequate number of the passageways 114, for example, six, ensures that the overall cross-sectional area (and flow capacity) will be substantially greater than that of the inlet orifice 136. As a result, the passageways 114 will provide an effective filter or screen preventing any contaminants from entering and perhaps blocking the orifice 136.

Another important feature of the present invention is the arrangement whereby when the outer spool or piston 102 is in its first or fully retracted position as shown in FIG. 3 (and the pressure to the pressure port 90 is shut-off), the lowermost outlet port 94 of the helical array of ports will be partially uncovered and connected to the drain line 98 in the valve body 10. This particular arrangement will prevent any leakage which there may be in the valve system within the manifold from causing an objectionable build up of back pressure The invention is claimed as follows:

1. In a valve structure, a body defining a plurality of cavities adapted for receiving cartridge type valve elements therewithin, and flow passages interconnecting said cavities and said valve elements, said valve body having fluid inlet port means for delivery of pressurized fluid into one of said valve elements, a regulated outlet port, a by-pass port and a drain port, the improvement comprising: valve means in a first cavity of said valve body for controlling pressure to a pressure compensated priority flow divider valve in a second cavity for directing a controlled primary fluid flow, on a priority basis, through said regulated outlet port of said valve body, and for directing any excess fluid to said by-pass port, said valve means comprising a modulated orifice double-spool valve including an elongated cage-like housing secured coaxially within said first cavity of said valve body, said housing defining between a stepped bounding wall thereof and said valve body a plurality of axially spaced, annular channels, first port means extending radially through said bounding wall of said housing and communicating with a first of said annular channels, a conduit communicating between said first of said annular channels and a fluid drain port in said valve body, a pressure port axially spaced from said first port means and extending radially through said bounding wall of said housing and communicating with a second of said annular channels and with said fluid entry port means, an axially-extending, reciprocally-shiftable, fluid-pressure-responsive, piston-like outer spool within said cage-like housing, said outer spool having upper and lower radially enlarged piston like body portions each in contiguous, fluid-sealing and reciprocally-sliding abutment with said bounding wall of said valve housing, said outer spool defining a longitudinally extending core intermediate of and connecting said upper and said lower body portions, said core being of a reduced diameter with respect to said body portions for defining with said housing an annular passageway in fluid-flow communication with said pressure port, radially-extending fluid transmission aperture means in a lower sector of said housing bounding wall for establishing fluid-flow communication between a lower annular channel of said valve and through said annular passageway with said pressure port upon displacement of said outer spool and said lower enlarged body portion from a retracted position to expose said aperture means, internal pressure-compensated flow regulatory means in said valve for establishing constant pilot fluid-flow in said valve, said pressure-compensating flow regulatory means including a central bore formed in an end portion of said outer spool and defining a sleeve, said central bore communicating with said annular passageway through a radial passageway extending from said central bore, radially extending through port means formed in said sleeve and communicating with an axially extending annular upper passageway between an upper end of said outer spool and said housing which in turn communicates with said drain port through discharge orifice means, a flow regulator inner spool slidably disposed in said central bore, said inner spool having a floor and an elongated, upwardly opening internal cavity, a flow controlling restricted inlet orifice in said floor of said flow regulator inner spool and communicating with said central bore and with said internal cavity, first spring means biasing said inner spool downwardly to open said radial through port means in opposition to fluid pressure applied to said inner spool through said passageway communicating with said annular passage, plug means surmounting said inner spool for restraining said inner spool and for sealing said central bore at an upper end thereof, second spring means for biasing said outer spool upwardly, and cap means for sealing an outer end of said first cavity and providing a stop for locating said outer spool in said retracted position.

2. The structure as set forth in claim 1 wherein said series of fluid-transmission aperture means in said lower section of said housing wall comprises a plurality of discrete circular apertures arrayed in a spiral configuration.

3. The structure as set forth in claim 1 wherein said outer spool is slidably shiftable within said housing selectively to block and to expose said fluid transmission aperture means for controlling flow of fluid through said valve.

4. The structure as set forth in claim 1 wherein said flow regulator inner spool is shiftable downwardly in response to a reduction in size of said discharge orifice in said valve to expose said through port means in said sleeve of said outer spool to balance flow of fluid inwardly into said internal cavity through said flow controlling restricted orifice in said floor of said inner spool.

5. The structure as set forth in claim 4 wherein application of fluid pressure through said central bore beyond that relieved by fluid flow through said flow controlling restricted orifice and sufficient to overcome biasing pressure of said first spring means being effective to shift said inner spool upwardly against said first spring means for progressively closing said through port means to reduce fluid flow therethrough.

6. The structure as set forth in claim 1 wherein increase in back pressure of fluid in said annular upper passageway effected through increased fluid pressure upon reduction of said discharge orifice means is effective to drive said outer spool downwardly against biasing forces of said second spring means while back pressure within said central bore of said pressure compensating flow regulator means increases to force said inner spool downwardly to open said radially extending through port means sufficiently so that flow outwardly therethrough balances flow inwardly through said flow-controlling restricted orifice, whereby fluid flow through said regulated output port remains substantially constant irrespective of fluid pressure applied at said fluid entry port means.

7. The structure as set forth in claim 4 wherein said central bore in said outer spool is in fluid-flow communication with said axially extending annular passageway circumscribing said outer spool at an upper end zone thereof and with radial port means in a circumscribing, cylindrical, sleeve-like upper wall of said outer spool.

8. A cartridge valve for installation in a cavity of a valve body for controlling pressure of fluid directed to a compensated priority flow divider valve installed in the valve body for directing a controlled fluid flow, on a priority basis, from a pressure inlet port of said valve body to a regulated outlet port of the valve body and for directing any excess fluid to a bypass port of the valve body, which valve body also includes a drain port, said cartridge valve comprising an elongated cage-like housing securable within said cavity of said valve body, fluid entry port means in said housing for providing fluid flow communication for pressurized fluid from said inlet port, passage means axially spaced from said entry port means through said housing for communicating with said outlet port of said valve body through said flow divider valve, axially extending, reciprocally shiftable fluid pressure responsive piston-like outer spool means within said cage-like housing movable between first and second positions for controlling flow of fluid between said entry port means and said passage means, internal pressure compensated flow regulatory means for establishing constant pilot fluid flow in said cartridge valve, said pressure compensated flow regulatory means including a central bore formed in said outer spool means and communicating with said entry port means through a passageway in said outer spool means extending from said central bore, said outer spool means further including a tubular sleeve portion communicating with said central bore, a radially extending through port in said sleeve portion for communicating with a pilot fluid passageway in said valve body communicating with said drain port, a flow regulator inner spool slidably disposed in said sleeve portion for movement between positions respectively opening and closing said through port, said inner spool having a floor and an internal cavity, a flow controlling restricted inlet orifice in said floor between said central bore and said internal cavity, first spring means biasing said inner spool to open said through port in opposition to fluid pressure applied to the inner spool through said passageway communicating with said entry port means, and second spring means biasing said outer spool means toward its first position.

9. A cartridge valve as defined in claim 8, wherein said inlet orifice in said floor has a first predetermined cross sectional area, said passageway communicating with said central bore and said entry port means comprises a plurality of discrete passageways, each of which has a cross sectional area less than said first cross sectional area, the total cross sectional area of said discrete passageways being greater than said first cross sectional area.

10. A cartridge valve as defined in claim 8, wherein said passage means disposed for communicating with said outlet port of the body comprises a series of apertures in said housing disposed in a helical axially overlapping array.

11. A cartridge valve, as defined in claim 8, wherein said outer spool means and said passage means in said housing are constructed so that when said outer spool means is in said first position, there is communication between said passage means and said drain port and no communication between said inlet port means and either said passage means or said drain port.

12. A cartridge valve as defined in claim 8, wherein said cage-like housing and said outer spool means are constructed so that said outer spool means has a long stroke between said first and second positions, and said second spring means comprises a high rate spring for promoting a smooth operation of the cartridge valve.

13. A cartridge valve as defined in claim 8, which includes fixed means for maintaining said second spring means under a predetermined force when said spool means is in said first position.

14. A cartridge valve as defined in claim 8, which includes adjustable means for adjusting force under which said second spring means is maintained when said spool means is in said first position.

* * * * *